United States Patent [19]

Amano et al.

[11] Patent Number: 5,100,994
[45] Date of Patent: Mar. 31, 1992

[54] HYDROPHILIC POLYCARBODIIMIDE POLYMER, PULP-LIKE MATERIAL CONSISTING OF SAID HYDROPHILIC POLYCARBODIIMIDE POLYMER, AND PROCESS FOR PRODUCING SAID POLYMER OR SAID MATERIAL

[75] Inventors: Satoshi Amano; Takeshi Arai, both of Tokyo, Japan

[73] Assignee: Nisshinbo Industries, Inc., Tokyo, Japan

[21] Appl. No.: 557,823

[22] Filed: Jul. 26, 1990

[30] Foreign Application Priority Data

Jul. 29, 1989 [JP] Japan .................. 1-197050

[51] Int. Cl.$^5$ .............. C08G 18/18; C08G 18/14; C07C 119/55; C07C 87/30
[52] U.S. Cl. .................. 528/44; 528/82; 528/84; 528/85; 521/105; 562/433
[58] Field of Search .......... 528/85, 84, 85, 52, 528/44; 521/99, 124, 125, 128, 105; 562/433

[56] References Cited

U.S. PATENT DOCUMENTS

| | | | |
|---|---|---|---|
| 3,980,594 | 9/1976 | Fabris et al. | 528/52 |
| 4,294,719 | 10/1981 | Wagner et al. | 528/44 |
| 4,424,288 | 1/1984 | Patton, Jr. et al. | 521/99 |
| 4,611,013 | 9/1986 | Ashida | 521/105 |
| 4,632,785 | 12/1986 | Barsa | 562/433 |
| 4,910,339 | 3/1990 | Henning et al. | 528/84 |

*Primary Examiner*—John Kight, III
*Assistant Examiner*—Duc Truong
*Attorney, Agent, or Firm*—Armstrong, Nikaido, Marmelstein, Kubovcik & Murray

[57] ABSTRACT

The present invention provides a hydrophilic polycarbodiimide polymer which has not been provided hitherto, a pulp-like material consisting of said polycarbodiimide polymer, and a process for producing said polycarbodiimide polymer or said pulp-like material.

28 Claims, No Drawings

HYDROPHILIC POLYCARBODIIMIDE POLYMER, PULP-LIKE MATERIAL CONSISTING OF SAID HYDROPHILIC POLYCARBODIIMIDE POLYMER, AND PROCESS FOR PRODUCING SAID POLYMER OR SAID MATERIAL

BACKGROUND OF THE INVENTION

1. Field of the Invention

The present invention relates to a hydrophilic polycarbodiimide polymer, a pulp-like material consisting of said hydrophilic polycarbodiimide polymer, and a process for producing said polymer or said material.

2. Prior Art

Polycarbodiimides, particularly aromatic polycarbodiimides are known to have high heat resistance and are used as a thermosetting molding material or the like by, for example, subjecting them in a powder form to hot pressing.

Processes for producing a polycarbodiimide are disclosed in, for example, Japanese Patent Application Kokai (Laid-Open) No. 61599/1976; D. J. Lyman et al., "Die Makromol. Chem., 67, 1 (1963)"; and E. Dyer et al., "J. Am. Chem. Soc., 80, 5495 (1958)". In these processes, as the polymerization solvent, there are used hydrocarbons (e.g. benzene), o-dichlorobenzene, etc.; the monomer concentration is 10-25% by weight; and there are used, as the organic diisocyanate, 4,4'-diphenylmethane diisocyanate, tolylene diisocyanate and various other diisocyanates. The polycarbodiimides produced according to these processes have a powder form. In the above documents, mention is also made of a film produced by taking out the polymer from the reaction system after 10 minutes from the start of reaction and casting the polymer.

In the above known reaction, however, when the reaction time from the start of reaction exceeds 10 minutes, the reaction system causes gelation and precipitation and accordingly it is impossible to obtain the reaction product as a solution. That is, in the above processes, it is impossible to obtain a high-molecular polycarbodiimide solution having excellent stability.

Meanwhile, it is anticipated that imparting hydrophilicity to a polycarbodiimide will widen the application of the polycarbodiimide; to impart hydrophilicity to a polycarbodiimide, it is considered to adopt a method for introducing a quaternary ammonium salt into the main chain of the polycarbodiimide, which method is already known and disclosed in Japanese Patent Publication No. 5118/1967 or Japanese Patent Publication No. 24194/1967. Production of a quaternary ammonium salt-containing polycarbodiimide by the above-mentioned known processes for polycarbodiimide production causes gelation and precipitation, and it is impossible to obtain an intended product, polycarbodiimide solution.

A polycarbodiimide solution can be obtained by suppressing a carbodiimidization reaction; however, the resulting polymer is not endowed with heat resistance which is a feature of polycarbodiimide, and has only about the same heat resistance that urethane has, which is a detrimental drawback.

Thus, there has hitherto been produced no hydrophilic polycarbodiimide.

SUMMARY OF THE INVENTION

The present invention has been made in view of the above-mentioned problems of the prior art and provides a hydrophilic polycarbodiimide polymer, a pulp-like material consisting of said polymer, and a process for producing said polymer or said material.

To this end, the present invention provides the hydrophilic polycarbodiimide polymer characterized by being obtained by the method, comprising reacting an organic diisocyanate and an alkyliminodiol to introduce a tertiary amino group into the organic diisocyanate, converting the introduced tertiary amino group to a quaternary ammonium salt with a quaternizing agent, and then effecting carbodiimidization in the presence of a carbodiimidization catalyst, or by being obtained by the method, comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, and then converting the introduced tertiary amino group to a quaternary ammonium salt with a quaternizing agent.

The present invention also provides the pulp-like material consisting of a hydrophilic polycarbodiimide polymer according to the present invention, characterized by being obtained by the method, comprising reacting an organic diisocyanate and an alkyliminodiol to introduce a tertiary amino group into the organic diisocyanate, converting the introduced tertiary amino group to a quaternary ammonium salt with a quaternizing agent, effecting carbodiimidization in the presence of a carbodiimidization catalyst to obtain a hydrophilic polycarbodiimide polymer, and transferring the hydrophilic polycarbodiimide polymer into a poor solvent for the polymer while applying a shearing force, or by being obtained by the method, comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, converting the introduced tertiary amino group to a quaternary ammonium salt with a quaternizing agent to obtain a hydrophilic polycarbodiimide polymer, and transferring the hydrophilic polycarbodiimide polymer into a poor solvent for the polymer while applying a shearing force.

The present invention also provides the process for producing a hydrophilic polycarbodiimide polymer, comprising reacting an organic diisocyanate and an alkyliminodiol to introduce a tertiary amino group into the organic diisocyanate, converting the introduced tertiary amino group to a quaternary ammonium salt with a quaternizing agent, and then effecting carbodiimidization in the presence of a carbodiimidization catalyst to obtain a hydrophilic polycarbodiimide polymer according to the present invention, or comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, and then converting the introduced tertiary amino group to a quaternary ammonium salt with a quaternizing agent to obtain a hydrophilic polycarbodiimide polymer according to the present invention.

The present invention further provides the process for producing a pulp-like material consisting of a hydrophilic polycarbodiimide polymer, comprising reacting an organic diisocyanate and an alkyliminodiol to introduce a tertiary amino group into the organic diisocyanate, converting the introduced tertiary amino group to a quaternary ammonium salt with a quaternizing agent, effecting carbodiimidization in the presence of a carbodiimidization catalyst to obtain a hydrophilic polycarbodiimide polymer, and transferring the hydrophilic polycarbodiimide polymer into a poor solvent for the polymer while applying a shearing force, to obtain a pulp-like material consisting of a hydrophilic polycarbodiimide polymer according to the present invention, or comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, converting the introduced tertiary amino group to a quaternary ammonium salt with a quaternizing agent to obtain a hydrophilic polycarbodiimide polymer, and transferring the hydrophilic polycarbodiimide polymer into a poor solvent for the polymer while applying a shearing force, to obtain a pulp-like material consisting of a hydrophilic polycarbodiimide polymer according to the present invention.

DESCRIPTION OF PREFERRED EMBODIMENTS

The present invention is described in detail below.

In order to obtain a hydrophilic polycarbodiimide of this invention, first an organic diisocyanate and an alkyliminodiol are reacted to introduce a tertiary amino group into the organic diisocyanate. In this reaction, the organic diisocyanate as a raw material includes, for example, those represented by the formula

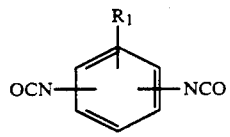

($R_1$ represents a lower alkyl group or a lower alkoxy group)
or by the formula

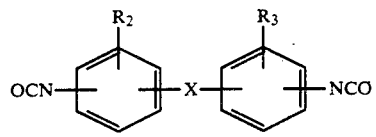

($R_2$ and $R_3$ each represent a hydrogen atom, a lower alkyl group or a lower alkoxy group, and X represents an oxygen atom or a methylene group).

As the alkyliminodiol, there is used, for example, a compound represented by the formula $$R-N-(R'-OH)_2$$

(R represents a lower alkyl group and R' represents an alkylene group, a polyalkylene group or an oxyalkylene group of 1-10 carbon atoms).

In the above reaction, the concentration of the organic diisocyanate is set at 1.50% by weight, preferably 5–40% by weight (when expressed in viscosity at 25° C., for example, 10–1,000cps, preferably 20–500cps); and the alkyliminodiol is used in an amount of about 1/10 to 1/50 equivalent per the amount of the organic diisocyanate. When the amount of the alkyliminodiol is more than 1/10 equivalent, the resulting polycarbodiimide polymer has low heat resistance. When the amount is less than 1/50 equivalent, the resulting polycarbodiimide polymer shows no pulping and becomes granular or gel-like lumps.

The above reaction is effected in an alicyclic ether. Specific examples of the alicyclic ether are tetrahydrofuran, dioxane, tetrahydropyran and their mixed solvents.

Next, the resulting organic diisocyanate having a tertiary amino group therein is treated with a quaternizing agent to convert the tertiary amino group to a quaternary ammonium salt. As the quaternizing agent, there can be mentioned known compounds such as dimethyl sulfate, methyl halides and the like.

Thereafter, carbodiimidization is effected in the presence of a carbodiimidization catalyst to obtain a hydrophilic polycarbodiimide polymer of the present invention. As the carbodiimidization catalyst, there can be used known compounds, i.e., phosphorene oxides such as 1-phenyl-2-phosphorene-1-oxide, 3-methyl 2-phosphorene-1-oxide, 1-ethyl-3-methyl-2-phosphorene-1-oxide, 1-ethyl-2-phosphorene-1-oxide and their 3-phosphorene isomers.

The thus obtained polycarbodiimide polymer of the present invention has a quaternary ammonium salt in the main chain and accordingly is hydrophilic. The main structure of the polycarbodiimide polymer, when the polymer is produced from the above mentioned starting materials, i.e. an organic diisocyanate and an alkyliminodiol, is represented by the formula

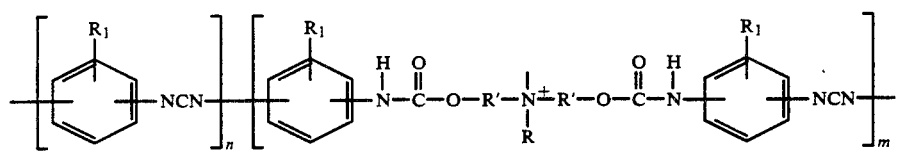

($R_1$ represents a lower alkyl group or a lower alkoxy group, R represents a lower alkyl group, and R' represents an alkylene group, a polyalkylene group or an oxyalkylene group of 1-10 carbon atoms)
or by the formula

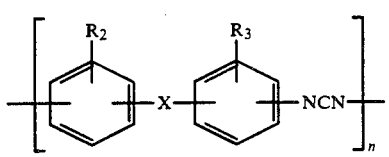

-continued

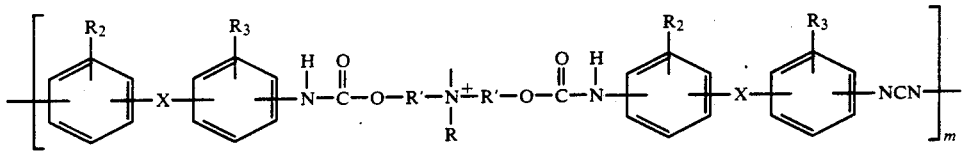

(R₂ and R₃ each represent a hydrogen atom, a lower alkyl group or a lower alkoxy group, X represents an oxygen atom or a methylene group, R represents a lower alkyl group, and R' represents an alkylene group, a polyalkylene group or an oxyalkylene group of 1-10 carbon atoms).

Instead of the above process comprising introducing a tertiary amino group into an organic diisocyanate, converting the tertiary amino group to a quaternary ammonium salt with a quaternizing agent, and effecting carbodiimidization, the hydrophilic polycarbodiimide polymer of the present invention can also be produced by a process comprising at least partially carbodiimidizing an organic diisocyanate in the presence of a carbodiimidization catalyst to form a prepolymer (polycarbodiimide), reacting the prepolymer with an alkyliminodiol to introduce a tertiary amino group into the polycarbodiimide, then converting the tertiary amino group to a quaternary ammonium salt with a quaternizing agent.

The polycarbodiimide polymer of the present invention as a quaternary ammonium salt in the main chain and accordingly has hydrophilicity. Therefore, when it is placed in a poor solvent, the quaternary ammonium salt portion functions as an intramolecular surface-active agent, whereby the polycarbodiimide polymer easily becomes a pulp-like material. That is, the above obtained hydrophilic polycarbodiimide polymer is transferred into a poor solvent for the polymer while applying a shearing force, whereby a pulp-like material consisting of the hydrophilic polycarbodiimide polymer of the present invention can be produced.

In that case, the hydrophilic polycarbodiimide polymer may be any of those produced according to the above two processes; the poor solvent is most economically water; and the shearing force is applied most easily by stirring.

The above process for producing the pulp-like material belongs to the fibrid process which has conventionally been used in pulping a polyester, a polyamide or the like. The fibrid process has not been applied to polymers of very low solubility such as polycarbodiimide and the like, because in the case of these polymers it has been impossible to prepare a dope solution in order to enable the use of the fibrid process.

From the standpoint of application on industrial scale, the fibrid process has not been applied even to a polyester, a polyamide, etc. because the control of poor solvent solution is complicated and incurs a high cost.

Advantage of the Invention

Thus, the hydrophilic polycarbodiimide polymer of the present invention has a quaternary ammonium salt in the main chain and resultantly has hydrophilicity; accordingly, when it is placed in a poor solvent, the quaternary ammonium salt portion functions as an intramolecular surface-active agent, and the polymer easily becomes a pulp like material. The use of a water-soluble alicyclic ether as the solvent also contributes to said pulping.

The thus obtained pulp-like material retains heat resistance intrinsically possessed by polycarbodiimide and also has a thermosetting property; therefore, it can be made into a sheet by itself, or can be used in paper making as a reinforcing agent, and thus can find various useful applications.

EXAMPLES

The present invention is described in more detail below by way of Examples and Comparative Examples.

EXAMPLE 1

800 g of methylenediphenyl diisocyanate (hereinafter referred to as MDI) was added to 2,000 ml of tetrahydrofuran (hereinafter referred to as THF). Thereto was added 13 g of methyl iminodiethanol, and the mixture was subjected to a reaction. Then, 13. 5 g of dimethyl sulfate was added as a quaternizing agent to effect quaternization.

To the resulting solution was added a carbodiimidization catalyst, and a reaction was effected at 67° C. for 4 hours. The resulting polymer solution was poured into water of about 10.fold volume while applying a shearing force, to obtain a pulp-like material.

The pulp-like material had the following properties.

| Freeness: | 744 ml (JIS P 8121) |
|---|---|
| Weight-average fiber length: | 0.8-1.0 mm (95% or more) (JIS P 8207) |
| Thermal decomposition temperature: | 400° C. |

The conditions employed in Examples 2-8 and Comparative Examples 1-2 are shown in Table 1. The proper ties of the pulp-like materials obtained in these Examples and Comparative Examples are shown in Table 2.

In Comparative Example 1, no pulp-like material was formed and instead a precipitate of granular form was obtained. In Comparative Example 2, a precipitate was formed in the middle of the reaction.

TABLE 1

| | Organic diisocyanate | Solvent | Alkyliminodiol | Quaternizing Agent | Reaction time (hr) |
|---|---|---|---|---|---|
| Example 2 | MDI (800 g) | THF (2 l) | Methyliminodiethanol (25 g) | Dimethyl sulfate (27 g) | 4 |
| Example 3 | MDI (800 g) | THF (2 l) | Methyliminodiethanol (8 g) | Dimethyl sulfate (8.5 g) | 4 |
| Example 4 | MDI (600 g) | THF (3.9 l) | Methyliminodiethanol (10.2 g) | Dimethyl sulfate (10.8 g) | 6 |
| Example 5 | TDI (600 g) | THF (1.6 l) | Methyliminodiethanol (13.7 g) | Methyl iodide (39 g) | 7 |

TABLE 1-continued

| | Organic diisocyanate | Solvent | Alkyliminodiol | Quaternizing Agent | Reaction time (hr) |
|---|---|---|---|---|---|
| Example 6 | TDI (600 g) | Dioxane (1.5 l, 100° C.) | Methyliminodipropanol (15.3 g) | Methyl iodide (39 g) | 3.5 |
| Example 7 | EDI (110 g) | THF (640 ml) | Ethyliminodiethanol (2.0 g) | Methyl iodide (3.0 g) | 6 |
| Example 8 | MDI (100 g) | THF (640 ml) | Methyliminodiethanol (17 g) | Methyl iodide (2.5 g) | 6.5 |
| Comparative Example 1 | MDI (800 g) | THF (2 l) | Methyliminodiethanol (76 g) | Dimethyl sulfate (81 g) | 4 |
| Comparative Example 2 | MDI (800 g) | Toluene (2 l) | Methyliminodiethanol (25 g) | Dimethyl sulfate (27 g) | 4 |

In the above table, MDI refers to methylenediphenyl diisocyanate; TDI referes to a mixture of 2,4-tolylene diisocyanate and 2,6-tolylene diisocyanate; and EDI refers to 4,4'-diphenylether diisocyanate.

TABLE 2

| | Freeness: | Weight-average fiber length: | Thermal decomposition temperature (°C.) |
|---|---|---|---|
| Example 2 | 726 | 0.54–0.81 | 390 |
| Example 3 | 760 | 1.0–1.2 | 405 |
| Example 4 | 730 | 0.8–1.0 | 400 |
| Example 5 | 720 | 0.35–0.50 | 390 |
| Example 6 | 730 | 0.45–0.70 | 385 |
| Example 7 | 760 | 1.0–1.2 | 405 |
| Example 8 | 725 | 0.60–0.80 | 400 |
| Comparative Example 1 | — | — | 290 |
| Comparative Example 2 | — | — | 300 |

EXAMPLE 9

800 g of MDI was added to 2,000 ml of THF. Thereto was added a carbodiimidization catalyst. The mixture was subjected to a reaction at 67° C. for 5 hours. The system was returned cooled to room temperature, 13 g of methyl iminodiethanol was added, and a reaction was effected for 2 hours. Then, 13. 5 g of dimethyl sulfate was added to effect quaternization. The resulting solution was poured into water of 13-fold volume while applying a shearing force, to obtain a pulp-like material.

The properties of the pulp-like material were as follows (the same test methods as in Example 1 were used).

| | |
|---|---|
| Freeness: | 763 ml |
| Weight-average fiber length: | 1.0–1. 2 mm. |
| Thermal decomposition temperature: | 400° C. |

EXAMPLE 10

800 g of MDI was added to 2,000 ml of THF. Thereto was added 13 g of methyl iminodiethanol, and a reaction was effected. 12 g of methyl chloride was introduced by bubbling while the system was vigorously stirred. Then, a carbodimization catalyst was added and a reaction was effected at 67° C. for 4 hours. The resulting solution was poured into water of 13-fold volume while applying a shearing force, to obtain a pulp-like material.

The pulp-like material had the following properties (the same test methods as in Example were used).

| | |
|---|---|
| Freeness: | 744 ml |
| Weight-average fiber length: | 1.0–1.2 mm |
| Thermal decomposition temperature: | 400° C. |

What is claimed is:

1. A hydrophilic polycarbodiimide polymer obtained by a method comprising reacting an organic diisocyanate and an alkyliminodiol to introduce a tertiary amino group into the organic diisocyanate, converting the introduced tertiary amino group to a quaternary ammonium salt with a quaternizing agent, and then effecting carbodiimidization in the presence of a carbodiimidization catalyst.

2. A hydrophilic polycarbodiimide polymer obtained by a method comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, and then converting the introduced tertiary amino group to a quaternary ammonium salt with a quaternizing agent.

3. A hydrophilic polycarbodiimide polymer according to claim 1 or 2, wherein the organic diisocyanate is represented by the formula

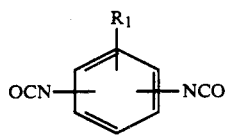

($R_1$ represents a lower alkyl group of a lower alkoxy group)
or by the formula

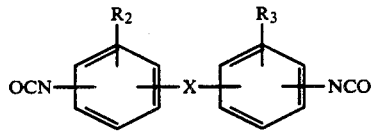

($R_2$ and $R_3$ each represent a hydrogen atom, a lower alkyl group or a lower alkoxy group, and X represents an oxygen atom or a methylene group).

4. A hydrophilic polycarbodiimide polymer according to claim 1 or 2, wherein the alkyliminodiol is represented by the formula

R—N—(R'—OH)$_2$ (R represents a lower alkyl group and R' represents an alkylene group, a polyalkylene group or an oxyalkylene group of 1-10 carbon atoms.

5. A hydrophilic polycarbodiimide polymer according to claim 1 or 2, which has a main structure represented by the formula

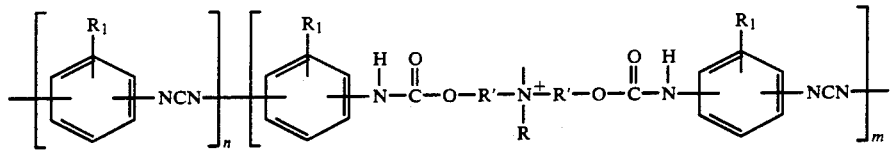

(R₁ represents a lower alkyl group or a lower alkoxy group, R represents a lower alkyl group, and R' represents an alkylene group, a polyalkylene group or an oxyalkylene group of 1-10 carbon atoms)
or by the formula

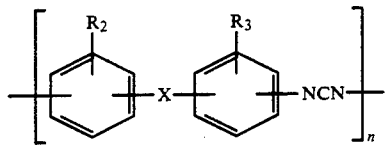

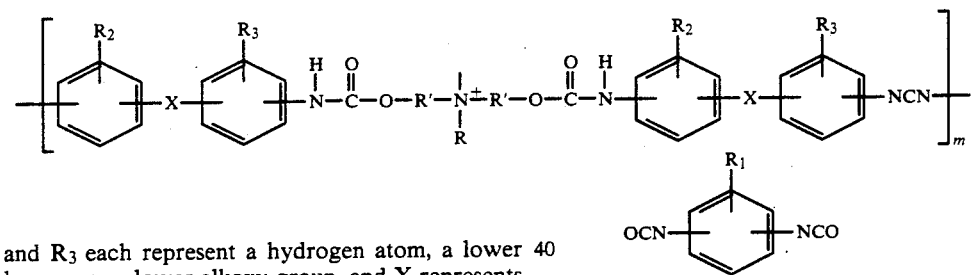

(R₂ and R₃ each represent a hydrogen atom, a lower alkyl group or a lower alkoxy group, and X represents an oxygen atom or a methylene group, R represents a lower alkyl group, and R' represents an alkylene group, a polyalkylene group or an oxyalkylene group of 1-10 carbon atoms).

6. A pulp-like material consisting of a hydrophilic polycarbodiimide polymer obtained by a method comprising reacting an organic diisocyanate and an alkyliminodiol to introduce a tertiary amino group into the organic diisocyanate, converting the introduced tertiary amino group to a quaternary ammonium salt with a quaternizing agent, effecting carbodiimidization in the presence of a carbodiimidization catalyst to obtain a hydrophilic polycarbodiimide polymer into a poor solvent for the polymer while applying a shearing force.

7. A pulp-like material consisting of a hydrophilic polycarbodiimide polymer obtained by a method comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, converting the introduced tertiary amino group to a quaternary ammonium salt with a quaternizing agent to obtain a hydrophilic polycarbodiimide polymer, and transferring the hydrophilic polycarbodiimide polymer into a poor solvent for the polymer while applying a shear force.

8. A pulp-like material consisting of a hydrophilic polycarbodiimide polymer according to claim 6 or 7, wherein the organic diisocyanate is represented by the formula

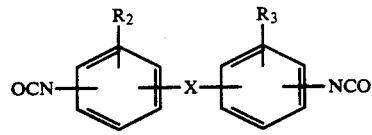

(R₁ represents a lower alkyl group or a lower alkoxy group)
or by the formula

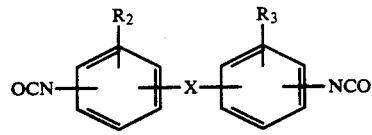

(R₂ and R₃ each represent a hydrogen atom, a lower alkyl group or a lower alkoxy group, and X represents an oxygen atom or a methylene group).

9. A pulp-like material consisting of a hydrophilic polycarbodiimide polymer according to claim 6 or 7, wherein the alkyliminodiol is represented by the formula

R—N—(R'—OH)₂

(R represents a lower alkyl group and R' represents an alkylene group, a polyalkylene group or an oxyalkylene group of 1-10 carbon atoms).

10. A pulp-like material consisting of a hydrophilic polycarbodiimide polymer according to claim 6 or 7, wherein the hydrophilic polycarbodiimide polymer has a main structure represented by the formula

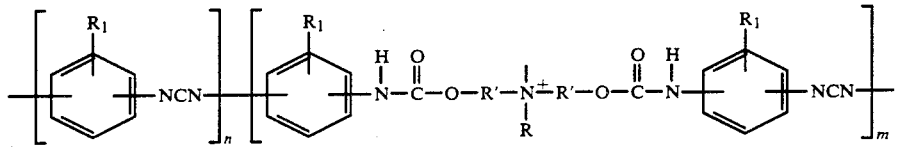

($R_1$ represents a lower alkyl group or a lower alkoxy group, R represents a lower alkyl group, and R' represents an alkylene group, polyalkylene group or an oxyalkylene group of 1-10 carbon atoms) or by the formula

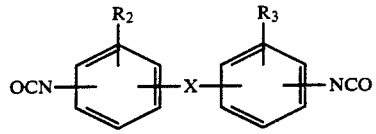

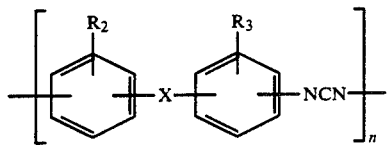

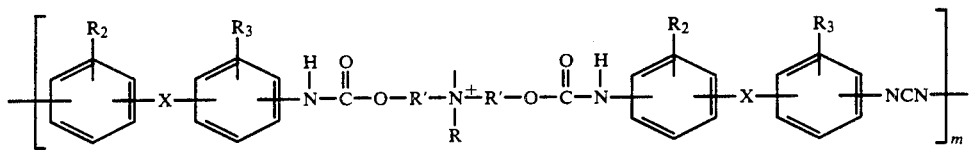

($R_2$ and $R_3$ each represent a hydrogen atom, a lower alkyl group or a lower alkoxy group, and X represents an oxygen atom or a methylene group, R represents a lower alkyl group, and R' represents an alkylene group, a polyalkylene group or an oxyalkylene group of 1-10 carbon atoms).

11. A pulp-like material consisting of a polycarbodiimide polymer according to claim 6 or 7, wherein the poor solvent is water.

12. A process for producing a hydrophilic polycarbodiimide polymer, consisting of reacting an organic diisocyanate and an alkyliminodiol to introduce a tertiary amino group into the organic diisocyanate, converting the introduced tertiary amino group to a quaternary ammonium salt with a quaternizing agent, and then effecting carbodiimidization in the presence of a carbodiimidization catalyst.

13. A process for producing a hydrophilic polycarbodiimide polymer, comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, and then converting the introduced tertiary amino group to a quaternary ammonium salt with a quaternizing agent.

14. A process for producing a hydrophilic polycarbodiimide polymer according to claim 12 or 13, wherein the organic diisocyanate is represented by the formula

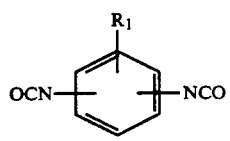

($R_1$ represents a lower alkyl group or a lower alkoxy group) or by the formula ($R_2$ and $R_3$ each represent a hydrogen atom, a lower alkyl group or a lower alkoxy group, and X represents an oxygen atom or a methylene group).

15. A process for producing a hydrophilic polycarbodiimide polymer according to claim 12 or 13, wherein the concentration of the organic diisocyanate is 5-40% by weight.

16. A process for producing a hydrophilic polycarbodiimide polymer according to claim 12 or 13, wherein the alkyliminodiol is represented by the formula $$R-N-(R'-OH)_2$$

(R represents a lower alkyl group and R' represents an alkylene group, a polyalkylene group or an oxyalkylene group of 1-10 carbon atoms).

17. A process for producing a hydrophilic polycarbodiimide polymer according to claim 12 or 13, wherein the alkyliminodiol is used in an amount of 1/10 to 1/50 equivalent per the amount of the organic diisocyanate.

18. A process for producing a hydrophilic polycarbodiimide polymer according to claim 12 or 13, wherein in the carbodiimidization, an alicyclic ether is used as the solvent.

19. A process for producing a hydrophilic polycarbodiimide polymer according to claim 18, wherein the alicyclic ether is tetrahydrofuran, dioxane, tetrahydropyran or their mixture.

20. A process for producing a pulp-like material consisting of a hydrophilic polycarbodiimide polymer, comprising reacting an organic diisocyanate and an alkyliminodiol to introduce a tertiary amino group into the organic diisocyanate, converting the introduced tertiary amino group to a quaternary ammonium salt with a quaternizing agent, effecting carbodiimidization in the presence of a carbodiimidization catalyst to obtain a hydrophilic polycarbodiimide polymer, and transferring the hydrophilic polycarbodiimide polymer into a poor solvent for the polymer while applying a shearing force.

21. A process for producing a pulp-like material consisting of a hydrophilic polycarbodiimide polymer, comprising at least partially carbodiimidizing an organic diisocyanate in the presence of a carbodiimidization catalyst, reacting the resulting polycarbodiimide with an alkyliminodiol to introduce a tertiary amino group into the polycarbodiimide, converting the introduced tertiary amino group to a quaternary ammonium salt with a quaternizing agent to obtain a hydrophilic polycarbodiimide polymer, and transferring the hydrophilic polycarbodiimide polymer into a poor solvent for the polymer while applying a shearing force.

22. A process for producing a pulp-like material consisting of a hydrophilic polycarbodiimide polymer according to claim 20 or 21, wherein the organic diisocyanate is represented by the formula

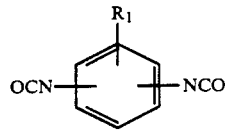

($R_1$ represents a lower alkyl group or a lower alkoxy group) or by the formula

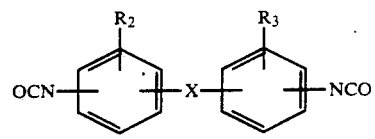

($R_2$ and $R_3$ each represent a hydrogen atom, a lower alkyl group or a lower alkoxy group, and X represents an oxygen atom or a methylene group).

23. A process for producing a pulp like material consisting of a hydrophilic polycarbodiimide polymer according to claim 20 or 21, wherein the concentration of the organic diisocyanate is 5-40% by weight.

24. A process for producing a pulp-like material consisting of a hydrophilic polycarbodiimide polymer according to claim 20 or 21, wherein the alkyliminodiol is represented by the formula

(R represents a lower alkyl group and R' represents an alkylene group, a polyalkylene group or an oxyalkylene group of 1-10 carbon atoms).

25. A process for producing a pulp-like material consisting of a hydrophilic polycarbodiimide polymer according to claim 20 or 21, wherein the alkyliminodiol is used in an amount of 1/10 to 1/50 equivalent per the amount of the organic diisocyanate.

26. A process for producing a pulp-like material consisting of a hydrophilic polycarbodiimide polymer according to claim 20 or 21, wherein in the carbodiimidization, an alicyclic ether is used as the solvent.

27. A process for producing a pulp-like material consisting of a hydrophilic polycarbodiimide polymer according to claim 26, wherein the alicyclic ether is tetrahydrofuran, dioxane, tetrahydropyran or their mixture.

28. A process for producing a pulp-like material consisting of a hydrophilic polycarbodiimide polymer according to claim 20 or 21, wherein the poor solvent is water.

* * * * *